US008767617B2

(12) United States Patent  
Wisely (10) Patent No.: US 8,767,617 B2  
(45) Date of Patent: Jul. 1, 2014

(54) NETWORK SELECTION (75) Inventor: David R Wisely, Ipswich (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 1890 days.

(21) Appl. No.: 11/886,777

(22) PCT Filed: Mar. 24, 2006

(86) PCT No.: PCT/GB2006/001096  
§ 371 (c)(1),  
(2), (4) Date: Sep. 20, 2007

(87) PCT Pub. No.: WO2006/103402  
PCT Pub. Date: Oct. 5, 2006

(65) Prior Publication Data  
US 2009/0232088 A1    Sep. 17, 2009

(30) Foreign Application Priority Data

Mar. 29, 2005   (EP) ..................................... 05251933

(51) Int. Cl.  
*H04W 4/00*   (2009.01)
(52) U.S. Cl.  
USPC ............................ 370/328; 370/329; 370/913
(58) Field of Classification Search  
USPC ............ 370/331, 389, 396, 395.21, 241, 328, 370/329, 913  
See application file for complete search history.

(56) References Cited

U.S. PATENT DOCUMENTS

| 6,374,109 | B1 * | 4/2002 | Shaheen et al. | 455/434 |
| 6,732,177 | B1 * | 5/2004 | Roy | 709/227 |
| 6,775,255 | B1 * | 8/2004 | Roy | 370/331 |
| 7,072,961 | B1 * | 7/2006 | Maclean et al. | 709/224 |
| 7,161,942 | B2 * | 1/2007 | Chen et al. | 370/392 |
| 7,230,951 | B2 * | 6/2007 | Mizell et al. | 370/401 |
| 7,242,960 | B2 * | 7/2007 | van Rooyen | 455/552.1 |
| 7,286,826 | B2 * | 10/2007 | Kim et al. | 455/444 |
| 7,406,098 | B2 * | 7/2008 | Taneja et al. | 370/468 |
| 7,433,929 | B2 * | 10/2008 | Guilford et al. | 709/217 |
| 7,436,843 | B2 * | 10/2008 | Gustafsson et al. | 370/401 |

(Continued)

OTHER PUBLICATIONS

Kassler, A., et al., "Multimedia Communication in Policy based Heterogeneous Wireless Networks," Vehicular Technology Conference, 2004, VTC 2004—Spring, 2004 IEEE 59th Milan, Italy May 17-19, 2004, Piscataway, NJ, vol. 5, May 17, 2004, pp. 2987-2992, XP 010766798.

(Continued)

*Primary Examiner* — Brian O'Connor  
(74) *Attorney, Agent, or Firm* — Nixon & Vanderhye P.C.

(57) ABSTRACT

A mobile station MS1 can communicate through a PLMN (2) and also through a number of local wireless networks e.g. WLAN (6) and WiMAX (7). When the user of MS1 wishes to run an application, for example an video player application, a suitable one of the networks is selected for the communication by obtaining data from the candidate networks using SIP INVITE messages that produce responses containing network parameter data for each of the candidate networks. The handset MS1 may also monitor local network traffic to determine network congestion and also check past history to determine whether many handovers have been made during previous sessions. The data is collated and checked with a service provider (10) so that a network selection decision can be made.

28 Claims, 4 Drawing Sheets

(56) References Cited

U.S. PATENT DOCUMENTS

| | | | |
|---|---|---|---|
| 7,502,615 B2* | 3/2009 | Wilhoite et al. | 455/442 |
| 7,519,391 B2* | 4/2009 | van Rooyen | 455/552.1 |
| 7,768,983 B2* | 8/2010 | Nylander et al. | 370/338 |
| 7,961,714 B1* | 6/2011 | Watson et al. | 370/352 |
| 7,965,627 B2* | 6/2011 | Li et al. | 370/229 |
| 8,145,263 B2* | 3/2012 | van Rooyen | 455/552.1 |
| 2004/0127208 A1 | 7/2004 | Nair et al. | |
| 2004/0131078 A1 | 7/2004 | Gupta et al. | |
| 2004/0218605 A1* | 11/2004 | Gustafsson et al. | 370/395.2 |
| 2006/0111112 A1* | 5/2006 | Maveddat | 455/439 |
| 2006/0120348 A1* | 6/2006 | Croak et al. | 370/352 |

OTHER PUBLICATIONS

Zuendt, M., Dornbusch, P., "A Generic API Regarding On-Demand QoS Support Over Heterogeneous Wireless Networks for QoS Aware Applications," CDTM Center for Digital Technology & Management, 5$^{th}$ World Wireless Congress 2004, San Francisco, Apr. 6, 2004.

Stephane, A., et al., "Mechanisms and hierarchical topology for fast handover in wireless IP networks," Centre for Telecommun. Res., King's Coll., London, UK; 2000.

International Search Report dated Jun. 13, 2006 in PCT/GB2006/001096.

Office Action dated May 3, 2011 issued in corresponding European Application No. 06710145.1-2412.

Office Action dated Feb. 19, 2008 issued in corresponding European Application No. 06710145.1-2412.

Applicant's Dec. 8, 2008 Response to Feb. 19, 2008 Office Action issued in corresponding European Application No. 06710145.1-2412.

* cited by examiner

NETWORK SELECTION

This application is the U.S. national phase of international application PCT/GB2006/001096 filed 24 Mar. 2006 which designated the U.S. and claims benefit of EP 05251933.7, dated 29 Mar. 2005, the entire content of which is hereby incorporated by reference.

BACKGROUND

1. Field

This invention relates to selecting a network to provide wireless communication with a terminal, when a plurality of such networks is available to provide the communication.

2. Description of Related Art

It is well known that public land mobile networks (PLMNs) can provide a range of services including voice and data. A user terminal can roam from one network to another as dictated by the user's service provider, which permits roaming according to agreements made with network providers.

Digital data services can also be provided to user terminals through other radio access technologies, such as wireless local area networks (WLANs). WLANS may utilise broadband DSL for example to provide a WLAN in a coffee shop or other location. Also, wide area WLANs have been proposed, known as Worldwide Interoperability for Microwave Access (WiMAX).

It has been proposed to provide seamless access to services from a user terminal through the agency of one or more of the aforementioned networks. However, hitherto, the methodologies for providing access to networks operable according to different transmission protocols are widely different. For example, network roaming for PLMNs is controlled primarily through the network rather than the terminal whereas for WLANs, the choice of network is made primarily at the terminal itself.

BRIEF SUMMARY

According to the invention there is provided a method of selecting a network to provide wireless communication with a terminal, when a plurality of such networks is available to provide the communication, the networks being operable according to different values of network operational parameters for the communication, the method comprising: defining the value of at least one of the operational parameters for the communication, inviting the networks to provide data corresponding to the operational parameters of the networks respectively available for the communication, receiving responses containing said data from at least one of the networks to identify at least one candidate network for the communication, referring data based on the or each response to a third party through one of the networks to obtain further data for making a decision on which network to use for the communication, and receiving the further data from the third party for making the decision.

The operational parameters may include the bandwidth available through an individual network, cost parameters, frame rate, min and max bandwidth, multicast support and signal path delay.

The third party may comprise a service provider for the terminal, coupled to at least one of the networks or a network handover decision server, coupled to at least one of the networks.

Data concerning levels of signal traffic congestion may be obtained by monitoring communications for other terminals connected to one or more of the networks, to be used in making the network selection decision. The data could be obtained by sending SIP signals to other terminals connected to one or more of the networks, the responses being used in making the network selection decision.

Also, history data concerning the duration and handovers for previous communications sessions established by the terminal may be stored for use in making the network selection decision.

A SIP signal may be sent to invite the networks to provide data corresponding to the operational parameters of the networks.

The network selection decision can then be made and a session opened with the selected network.

The decision can be made at the terminal or the third party may make the decision and communicate it to the terminal. Also the decision may be made in stages at nodes within one or more of the networks.

An application to be run by the terminal may be selected by the user, such as an video player application or a browser application and the value of at least one of the network operational parameters for the communication can be defined according to characteristics of the application.

The invention also includes each of a terminal configured for use in performing the network selection method, a network arrangement configured to perform the method, and third party device for use in the method.

BRIEF DESCRIPTION OF DRAWINGS

In order that the invention may be more fully understood, an embodiment thereof will now be described by way of example with reference to the accompanying drawings, in which.

DETAILED DESCRIPTION OF EXAMPLE EMBODIMENTS

Network Overview

Figure 1:
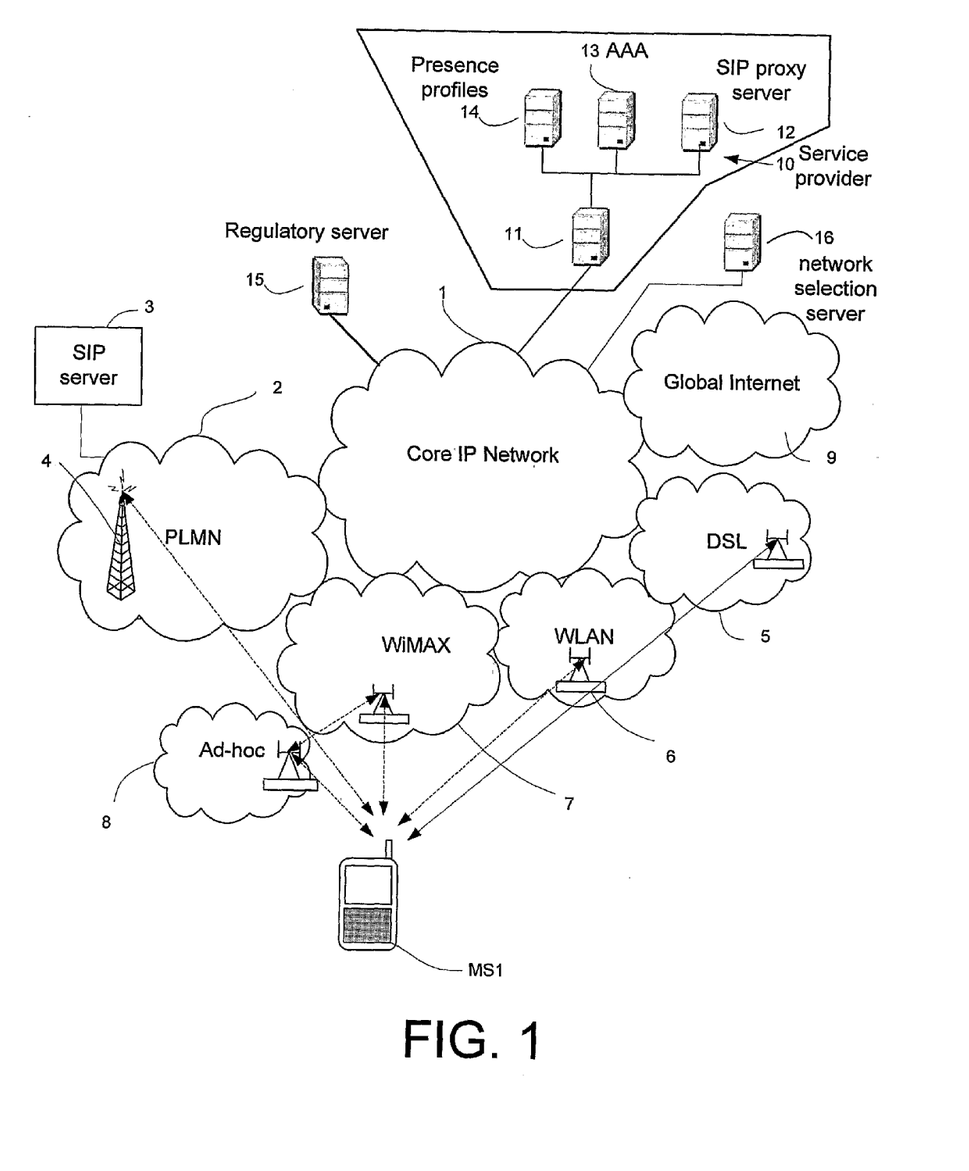
FIG. 1 is a schematic block diagram of a network arrangement to provide communication with a terminal.

FIG. 1 illustrates a terminal in the form a mobile station MS1 which may typically be in the form of a personal digital assistant (PDA) that is capable of voice telephony and also processing digital data. The subscriber for the mobile station MS1 may have a contract with a network provider. The arrangement of networks shown in FIG. 1 includes a core IP network 1. The network 1 may be based upon a fixed network capable of providing digital services communicated through the network as packet data e.g. in Transmission Control Protocol/Internet Protocol (TCP/IP) format, and may be an adjunct to a conventional PSTN.

The core IP network 1 is connected to a public land mobile network (PLMN) 2 capable of handling both voice communications and data services e.g. through a general packet radio service (GPRS). The PLMN 2 may comprise a 2G, 2.5G or 3G network capable of handling data services e.g. in TCP/IP format. The PLMN 2 has an associated Session Initiation Protocol (SIP) server 3 capable of processing SIP messages e.g. according to the IETF Request For Comment (RFC) 2543). The networks can also carry other services such as voice or video in User Datagram Protocol (UDP) format. An antenna 4 is associated with one of the base stations of networks. In this example, the antenna 4 communicates with mobile station MS1.

Additionally, MS1 can communicate with four different, local, wireless networks 5 to 8. Network 5 comprises a Digital Subscriber Line (DSL) network which provides a wireless coverage over a relatively small area e.g. in a coffee shop. Network 6 comprises a WLAN providing coverage over e.g. the area of a town square or other location. Network 7 comprises a WiMAX network, which comprises a WLAN over a wider area than network 6. Also, the mobile station MS1 can communicate through an ad hoc wireless network 8 which may be formed for example by a collection of computers where one computer with wireless access would connect to WiMAX network 7 and act as a gateway computer for the others. In this way, communication can be achieved with the mobile station MS1 through the gateway computer in the ad hoc network 8 to the network 7. The same gateway computer or another computer is the ad hoc network 8 would act as a SIP server for the ad hoc network 8. Communication to the global internet 9 is provided through the core IP network 1.

A service provider 10 is connected to the core IP network 1. The service provider 10 comprises a main server 11 coupled to a SIP proxy server 12, an access authentication and authorisation (AAA) server 13 and a presence profiles' server 14. The service provider 10 manages the supply of digital services to mobile station MS1 and has a billing arrangement with the subscriber for the mobile terminal MS1. The service provider 10 also has service arrangements with the various networks, in particular the core IP network 1, PLMN 2 and at least some of the networks 6 to 8. Thus the service provider can offer services to users of the networks 5 to 8. The SIP server 12 can process SIP messages received from the various networks and the mobile station MS1. As known in the art, the SIP messages may be requested to initiate a session between terminals connected to the network arrangement. For example, a first terminal may send a SIP request to the SIP proxy server 12 which refers to presence profiles for other users and terminals for the network stored in server 14 to provide the address of a terminal or server to which the requesting terminal is to be connected in a session. Access, authentication and authorisation for the session are determined by means of AAA server 13 as known in the art. The main server 11 may control the initiation of the session and also billing to subscribers to the services provided by the service provider 10.

A regulatory server 15 is connected to the core IP network 1 to provide data relating to the permitted regulatory billing arrangements etc permissible within the network arrangement.

Also, a handover decision/network selection server 16 is connected to the network 1 to assist in making handover decisions for the terminal MS1 where a choice of networks can be made for a session.

Figure 2:
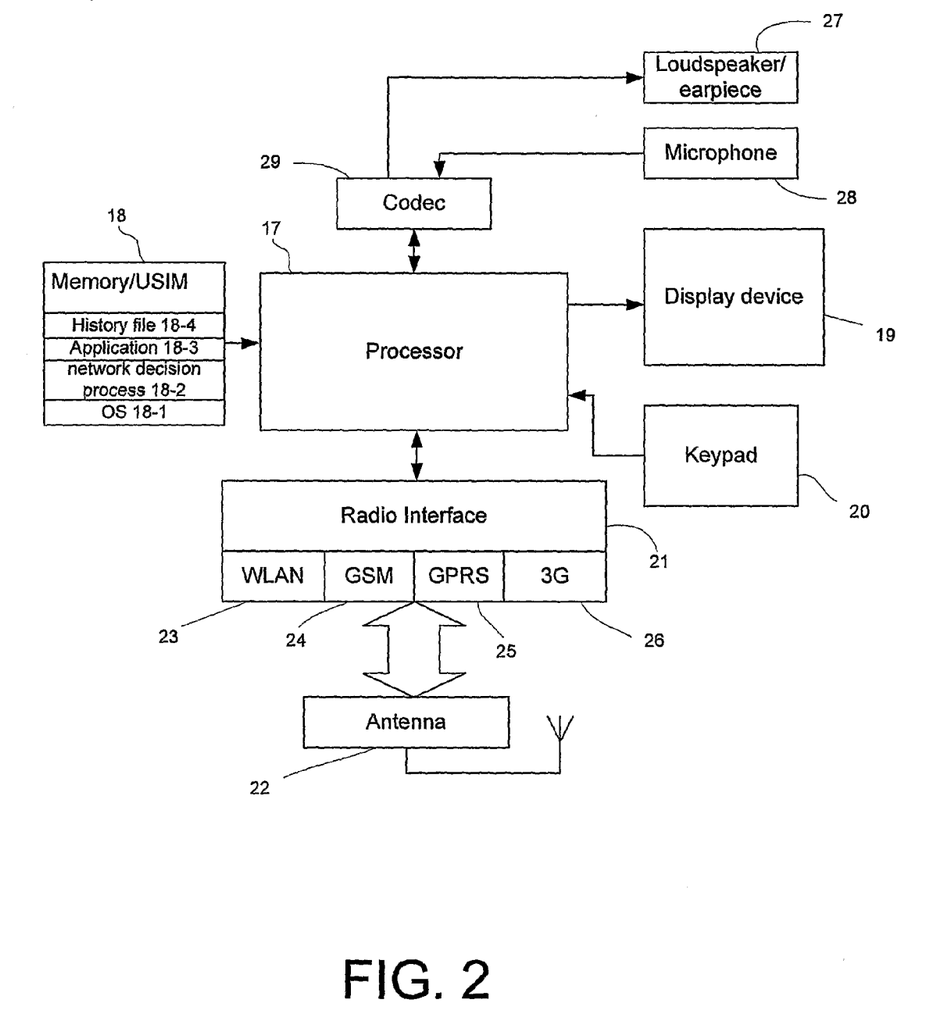
FIG. 2 is a schematic block diagram of a terminal for use in the configuration of FIG. 1.

FIG. 2 illustrates the major circuit components of the mobile station MS1. The mobile station MS1 may comprise a 3G handset capable of handling both voice telephony and data e.g. in TCP/IP format, through 3G and Global System for Mobile Communications (GSM) networks with GPRS. Alternatively, MS1 may comprise a personal digital assistant (PDA) or a laptop computer that is enabled for radio communication with the networks shown in FIG. 1. The mobile station MS1 comprises a main processor 17 with an associated memory arrangement 18. The memory 18 can be of any suitable form, for example Random Access Memory (RAM) and Read Only Memory (ROM) together with rewritable storage such as a flash memory or a hard disk. The memory 18 holds an operating system (OS) 18-1 for the processor 17 and a network decision process 18-2 for processing network selection and handover decisions. The memory 18 also includes a user application 18-3 to be run by the processor 17, a video player application in this example. A history file 18-4 contains information about recent usage of the mobile station MS1, for example the networks used, the duration of previous sessions and the numbers of network handovers that have occurred during previous sessions. Also, a Universal Subscriber Identity Module (USIM) is included within the memory arrangement 18 for authentication purposes with the PLMN 2 in a manner well known in the art.

The processor 17 drives a display device 19 e.g. a liquid crystal display panel, under the control of a keypad 20. The processor 17 can communicate with the networks shown in FIG. 1 through a radio interface 21 coupled to an antenna arrangement 22.

The radio interface 21 includes circuit configuration for communicating with different networks, with circuits 23 to 26 allowing communication with wireless LANs e.g. WLAN 6, GPRS enabled GSM networks and 3G networks.

Voice telephone and audio outputs are fed to and from the processor 17 by means of a loudspeaker/earpiece arrangement 27 and microphone 28 through a codec 29. Thus, the mobile station MS1 can be used with different networks for voice telephony and also to transmit and receive data in e.g. TCP/IP format.

Figure 3:
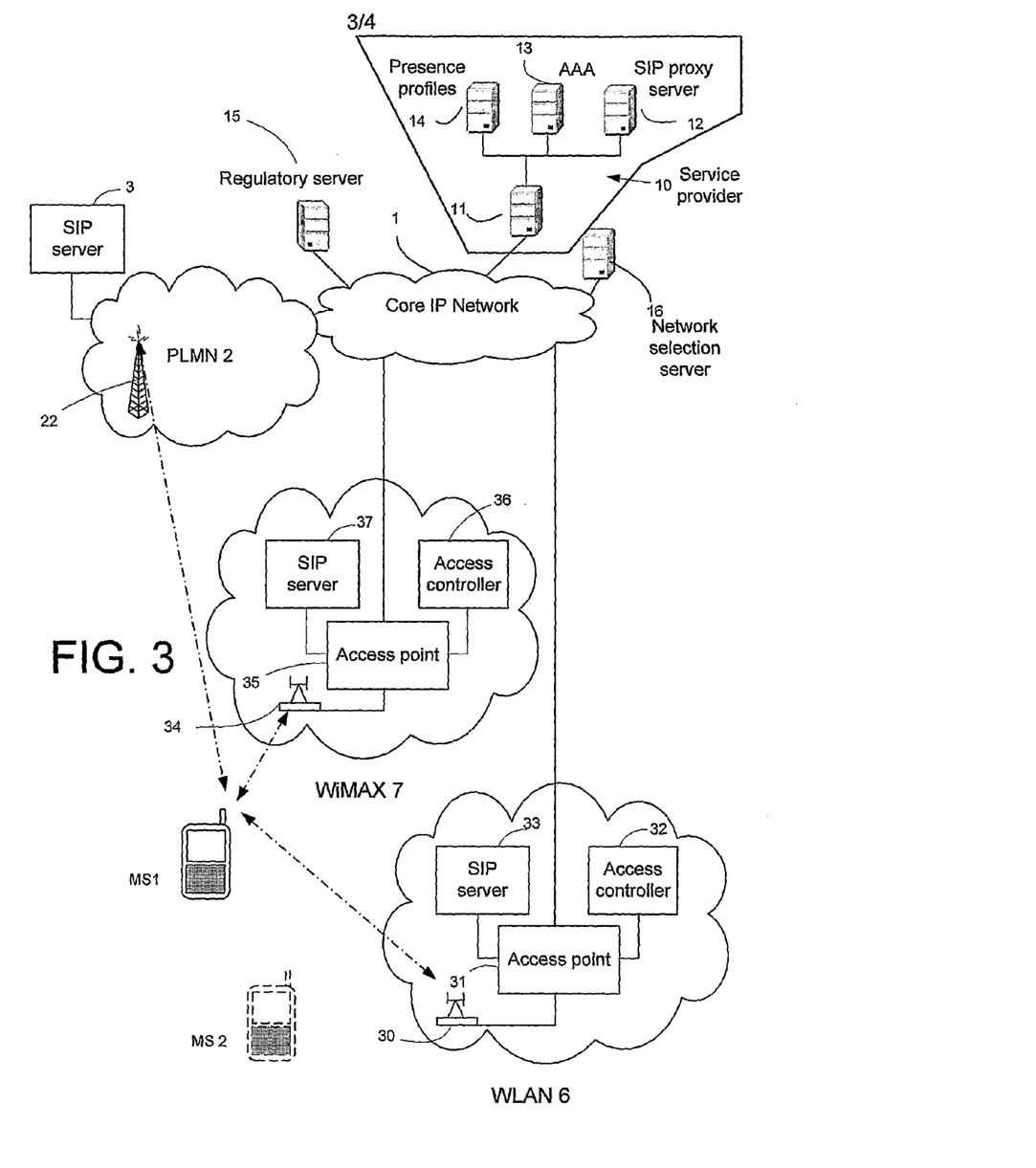
FIG. 3 is a block diagram illustrating the components of some networks in more detail.

The networks WLAN 6 and WiMAX 7 are illustrated in more detail in FIG. 3, the networks 5, 8 and 9 having been omitted from FIG. 3 in order to simplify the drawing.

Considering WLAN 6, the network includes an antenna 30 for establishing radio communication with MS1. The antenna 30 is coupled through a transceiver/modem 31 to the core IP network 1. Also, access to the WLAN 6 is controlled by an access controller 32. A SIP server 33 is provided to process SIP messages received from network 1 and also from terminals such as MS1.

WiMAX 7 is of a similar configuration to WLAN 6 with an antenna 34, transceiver/modem 35, access controller 36 and SIP server 37.

As shown in FIG. 3, the mobile station MS1 is within the radio coverage areas of WLAN 6 and WiMAX network 7. Furthermore, the mobile station MS1 can communicate through PLMN 2.

Operation

Referring to FIG. 3, the mobile handset MS1 is, as previously explained, able to communicate with PLMN 2, WiMAX 7 and WLAN 6. The user of MS1 wishes to run the video player application 18-3 on the processor 17 of MS1, e.g. for streaming a 100 kbit/s one or two way video/audio stream, and a decision needs to be made regarding which network to use for the video streaming and for the send and receive operations. The selection process will now be described in more detail with reference to the signalling diagram of FIG. 4.

Figure 4:
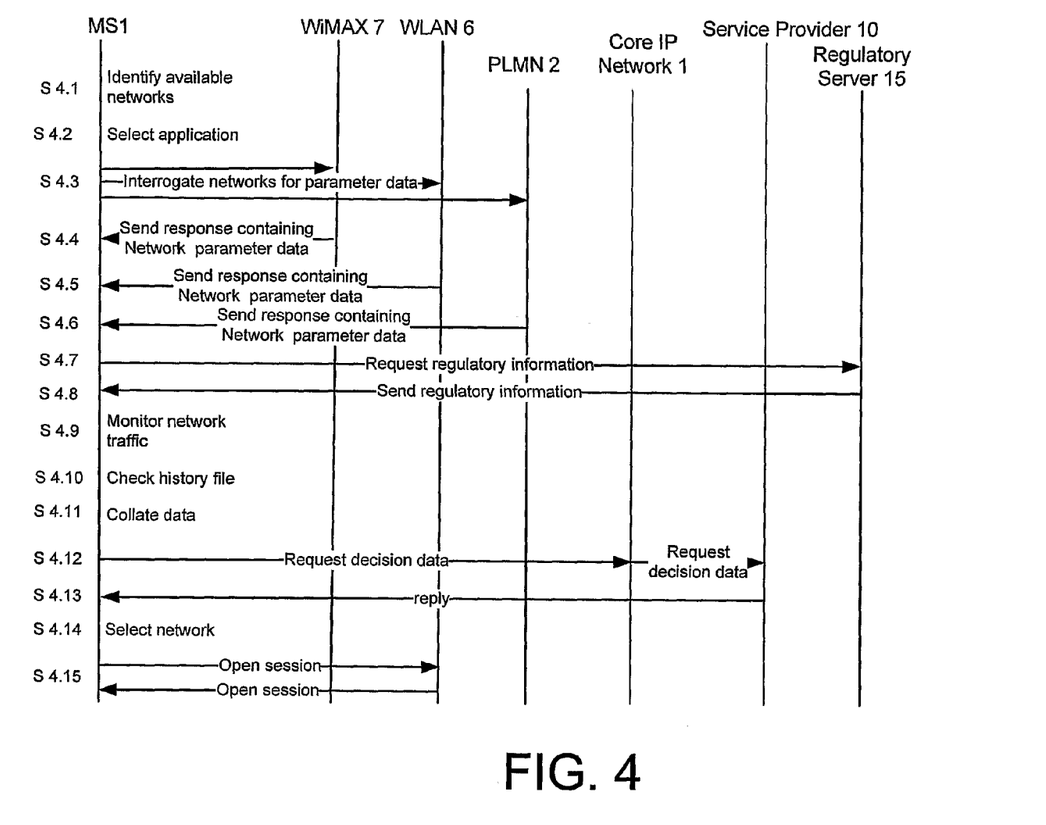
FIG. 4 is a signalling diagram that illustrates a network selection process.

At step S4.1, the mobile handset MS1 identifies the networks which are available for communication. This may involve monitoring broadcast signals from the networks. For the cellular PLMN 2, this may involve monitoring the Broadcast Control Channel (BCCH) for cells of the network 2. WLAN 6 and WiMAX 7 may be configured according to IEEE 802.11 so as to broadcast individual Service Set Identifiers (SSIDs) on individual radio channels, which are detected by the mobile station MS1.

The user application that requires a network is chosen at step S4.2 by the user of MS1. In this example, the chosen application is the video player application 18-3 but other applications can be selected, for example a browser application or a media player application to receive a download from a remote server. The selected application is to be run by the processor 17. The selected application requires particular network parameters to be available for a successful communication. Also, it is desirable to select the network which offers the best value for the communication, in terms of cost to the subscriber of MS1 and any other relevant network related parameters. For example, in the case of the video player application 18-3 a network connection is required that is capable of handling bursty signals e.g. with a maximum burst rate of 100 kbit/s. The PLMN 2, WLAN 6 and WiMAX 7 may have different charging rates to the service provider 10, may have a greater bandwidth than the PLMN 2 and may be cheaper in terms of cost, but not always.

At step S4.3 the mobile station MS1 interrogates the available networks for network parameter data corresponding to available parameters for communicating with the mobile station MS1. The interrogation signals sent at step S4.3 may comprise a SIP INVITE signal that invokes the "INVITE" method which forms part of the aforementioned IETF RFC 2543 protocol. The method is written to invoke a response from the SIP servers of the interrogated networks, the response containing details of the network parameters for the network concerned. The SIP INVITE and response signals may contain Extensible Mark-up Language (XML), IEEE 802.21 information elements or any other descriptions of the attached networks, their congestion and other properties.

Since the mobile station MS1 has identified the available networks, the interrogation signals sent at step S4.1 can be delivered on appropriate channels used by networks 2, 6 and 7.

The SIP INVITE signals sent at step S4.3 are recognised by SIP servers 33, 37 for the networks 6, 7 and in response, the servers 33, 37 send data corresponding to network parameters for the networks 6, 7 respectively at steps S4.4 and S4.5. Similarly, PLMN 2 responds to the interrogation signal through its SIP server 3 to provide corresponding network data for the PLMN 2 at step S4.6.

Thus, by means of these steps, the mobile station MS1 gathers information about the suitability of the available networks for providing a communication path for the video player application to be run by MS1. The gathered information may comprise the following: the bandwidth available through the interrogated network, cost parameters and other data such as frame rate, minimum and maximum bandwidth, multicast support and signal path delay. Other information that can be gathered by mobile station MS1 will be evident to those skilled in the art.

Also, at step S4.7, the mobile handset MS1 sends a SIP INVITE signal to the regulatory server 15. The SIP INVITE signal may include details of the candidate networks for the video communication i.e. WLAN 6, WiMAX 7 and PLMN 2 discovered in the preceding steps shown in FIG. 4. The regulatory server 15 provides information about the permitted charging rates and connectivity within the network arrangement. For example, it may be that one of the candidate networks offers a charging structure for the video or other communication at a rate which offends regulatory rules specified by the server 15. Also, it may be that one of the networks e.g. WLAN 6 is not permitted to communicate at a proposed charging rate with the core IP network 1. Also some networks may be permitted to handle audio data but not video data. Other regulatory network constraints will be evident to those skilled in the art. The corresponding regulatory information is sent in response to the SIP INVITE signal sent to the server 15, to the mobile station MS1 at step S4.8.

The mobile station MS1 may also discover locally whether communication with the individual candidate networks is congested as a result of concurrent sessions set Up with other mobile stations e.g. MS2 shown in FIG. 3. The monitoring of network signal traffic from adjacent mobile stations such as MS2, is illustrated at step S4.9 in FIG. 4. This can be achieved, for example, by sending a SIP INVITE from the terminal to a SIP server in the network(s) that monitors network performance. The SIP server would then send a SIP response back to the inquiring terminal. Thus, information about the congestion of the candidate networks is developed at step S4.9.

At step S4.10, the mobile handset MS1 checks its history file 18-4 to determine the nature of previous communications through the mobile handset MS1. For example, if the history file indicates that the user generally is on the move during communications and tends to roam between networks during sessions established with MS1, then the local wireless networks such as WLAN 6 are likely to be less suitable for a session than PLMN 2, particularly for sessions of a longer duration such as a video download.

The data for the networks obtained during the preceding steps are collated in step S4.11 in order to prepare the mobile station to initiate the process of making a network selection decision. The network selection decision also involves reference to a third party, in this example the server 11 of the service provider 10, as shown at step S4.12. The mobile station MS1 requests decision data from the service provider 10 by establishing a communication through one of the networks e.g. PLMN 2, via the core IP network 1, to the service provider 10.

The main server 11 of service provider 10 includes an associated data store that includes information about plurality of local area networks, including, in this example, WLAN 6 and WiMAX 7. The information includes charging information, which may for example be different from the charging information reported at steps S4.4 to S4.6 as a result of bulk discounts negotiated between the service provider and the individual networks. For example, the WLAN 6 and WiMAX 7 may offer lower pricing levels than PLMN 2. Nevertheless when the server 11 checks the customer profile for the subscriber for MS1, it may discover that the subscriber has a billing contract with a fixed monthly charge for a predetermined amount of network use, and for the month concerned, the subscriber has not used up the monthly allocation. Thus, towards the end of the month, it may be more economic for the subscriber to use up the unused allocation for PLMN 2 which has already been paid for, rather than use networks 6 or 7 even though their offered rates are cheaper than PLMN 2.

The server 11 may also have additional information about the suitability of networks 2, 6, 7 for the communication, such as network reliability, spurious failures in bit error rate and the like encountered by users previously. The data appropriate for facilitating the network selection decision is sent by the service provider 10 to the mobile station MS1 at step S4.13.

Thus, the mobile station MS1 has gathered through the preceding steps, data for use in selecting a network from: the proposed application (18-3), local users (MS2), the service provider (10), the candidate networks (2, 6, 7), the history file (18-4) and a regulatory information source (15).

Then, at step S4.14, the network selection decision process is initiated by running the decision process 18-2 shown in FIG. 2 on the processor 17, in order to process the aforementioned data and select the most appropriate network. The decision-making may be performed according to artificial intelligence techniques, fuzzy logic or other approaches known per se in the art. The decision process may include providing a display of the candidate networks and their parameters on the display device 19 of the mobile station MS1 so that if appropriate, the user of the mobile station can participate in the final network selection decision.

Then, at step S4.15 shown in FIG. 4, a session for the application is opened with the selected network. In this example, WLAN 6 has been selected by the process at step S4.14 and the session is opened with network 6. The opening of the session may involve an authentication procedure according to the protocol of the network concerned.

Many modifications and variations to the decision process can be made in accordance with the invention.

For example, data from not all of the sources need be obtained to make the selection e.g. data from the regulatory server 15 may be optional.

Also, it will be understood that the network selection process can be used not only to make an initial selection of a network for a session, but also to select a network for a handover during a session.

Also, the network selection decision (S4.14) can be made in several stages, not all of them being carried out at the handset MS1. For example, the data sent at step S4.12 to the service provider 10, may be sufficient to allow the decision process to be made entirely by the server 11 of the service provider 10 and a final decision communicated back to the mobile handset MS1 at step S4.13.

Furthermore, the decision process may be distributed at other nodes in the network so that the preliminary decision can be made and then finally ratified either by the user at step S4.14 or by the service provider at step S4.13. SIP can be used to mediate the distributed selection decision and to obtain the correct security credentials to allow attachment to the selected network.

Furthermore, a third party in the form of the network selection sever 16 may provide a bespoke selection service to respond to the data sent at step S4.12 to provide the data sent at step S4.13. The server 16 may be able to provide additional data relating to the networks. For example, if the network 5 comprises a hot spot in e.g. a coffee shop, the network may require the user to purchase a scratch card with a network access number that provides the user with access to the network. This arrangement is known in the art. Thus, the network 5 may not have a customer billing arrangement with the service provider 10 and so is not known to the service provider. The network 5 may however be known to the network selection server 16 and so the server 16 can provide accreditation information as well as other data for networks such as network 5.

Alternatively, a third party in the form of a corporate server (not shown in the figures) may be set up to respond to the data sent at step S4.12 to provide the data sent at step S4.13. The corporate server may be able to provide additional data relating to the terminal or the server may make a handover decision—based on information collected by the terminal or from elsewhere. For example, an employee user of handset MS1 may be prevented from roaming on to networks with non-authorised capabilities (e.g. video on 3G) where adequate, cheaper alternatives exist (e.g. WLAN or GSM). Thus the corporate server may restrict which networks can be selected (e.g. MS1 is currently connected to a good voice network so there would be no need to switch to a 3G network when they are prevented from using such a network).

Also, more than one network may be selected. For example, for a multimedia download to be downloaded to the mobile station MS1, the optimum network selection may comprise the PLMN 2 for audio data and the WLAN 6 for corresponding video data. Each application and each media component (e.g. audio/video) may also use the network selection procedure independently.

In other embodiments, the SIP servers attached to networks 2 to 8 and service 5 provider 10 may also communicate, either dynamically during the network selection decision process or offline, with the regulatory server 15 in order to ensure that network selection and handover decisions comply with regulation (e.g. always informing users if a cheaper network is available and matching a tariff if the user is prevented from accessing a new network).

The invention is not restricted to radio networks and can be used in wireless networks that use optical communication techniques such as infrared. It will be appreciated from the foregoing that network selections can be made for the other networks shown in FIG. 1 e.g. networks 5 and 8 depending on the location of MS1.

The invention claimed is:

1. A method of selecting a network to provide wireless communication with a terminal, when a plurality of such wireless networks is available to provide the communication, the networks being operable according to different values of network operational parameters for the communication, the method comprising at the terminal:
    defining the value of at least one of the operational parameters for the communication,
    sending an invite to the wireless networks available for the communication inviting them to provide information about their operational parameters;
    receiving responses containing said information from one or more of the wireless networks and using said information to identify at least one candidate wireless network for the communication;
    referring data based on the or each response from the one or more identified candidate networks to a third party device through one of the wireless networks to obtain charge-related information for making a decision on which of the candidate wireless network to use for the communication; and
    receiving the charge-related information from the third party device for making the decision.

2. A method according to claim 1, wherein the operational parameters include at least one of the bandwidth available through an individual network, cost parameters, frame rate, minimum and maximum bandwidth, multicast support and signal path delay.

3. A method according to claim 1, wherein the referring of data based on the or each response to a third party device comprises referring the data to a service provider for the terminal, said service provider being coupled to at least one of the wireless networks.

4. A method according to claim 1, wherein the referring of data based on the or each response to a third party device comprises referring the data to a network handover decision server, said network handover decision server being coupled to at least one of the wireless networks.

5. A method according to claim 1, further comprising obtaining data concerning levels of signal traffic congestion by monitoring communications for other terminals connected to at least one of the wireless networks, wherein said data is used in making the network selection decision.

6. A method according to claim 1, further comprising storing history data concerning the duration and handovers for previous communications sessions established by the terminal, wherein said history data is used in making the network selection decision.

7. A method according to claim 1, further comprising sending a Session Initiating Protocol (SIP) signal to invite the wireless networks to provide information corresponding to the operational parameters of the wireless networks.

8. A method according to claim 1, further comprising making the network selection decision and opening a session for an application with the selected wireless network.

9. A method according to claim 8, further comprising making the network selection decision at the terminal.

10. A method according to claim 9, wherein the third party device makes the decision and communicates it to the terminal.

11. A method according to claim 9, further comprising making the decision in stages at nodes within one or more of the wireless networks.

12. A method according to claim 1, further comprising making a network handover according to the network selection decision.

13. A method according to claim 1, further comprising selecting an application to be run by the terminal and defining the value of at least one of the operational parameters for the communication according to characteristics of the application.

14. A method according to claim 1, wherein said receiving responses includes receiving responses containing said information from the plurality of wireless networks to identify a plurality of candidate wireless networks for the communication.

15. A terminal to provide wireless communication with at least one of a plurality of wireless networks operable according to different values of network operational parameters for the communication, the terminal comprising:
   a processor configuration to run an application requiring a defined value of at least one of the network operational parameters for the communication;
   a transmitter arrangement to send signals inviting the wireless networks available for the communication to provide information about their operational parameters;
   a receiver arrangement to receive responses containing said information from one or more of the wireless networks and use this information to identify at least one candidate wireless network for the communication;
   the transmitter arrangement configured to refer data based on the or each response from the one or more identified candidate networks to a third party device through one of the wireless networks to obtain charge-related information for making a decision on which wireless network to use for the communication; and
   the receiver arrangement configured to receive the charge-related information from the third party device for making the decision.

16. A terminal according to claim 15, further comprising a memory that stores a program to be run by the processor configuration for making or assisting in the making of the network selection decision.

17. A terminal according to claim 15, further comprising a memory that stores history data concerning the duration and handovers for previous communications sessions established by the terminal, wherein said history data is used in making the network selection decision.

18. A terminal according to claim 15, wherein the transmitter arrangement is configured to send a Session Initiating Protocol (SIP) signal to invite the wireless networks to provide information corresponding to the operational parameters of the wireless networks.

19. A terminal according to claim 15, wherein the processor configuration is configured to open a session for the application with the wireless network selected in the network selection decision.

20. A terminal according to claim 15, said terminal comprising a mobile station for use with a cellular wireless network and a wireless local area network.

21. A terminal according to claim 15, wherein the receiver arrangement receives responses containing said information from the plurality of wireless networks to identify a plurality of candidate wireless networks for the communication.

22. A network arrangement to provide wireless communication with a terminal, the network arrangement including:
   a plurality of wireless networks configured to provide wireless communication with the terminal, the networks being configured according to different values of network operational parameters for the communication, the wireless networks being configured to provide information about their operational parameters in response to receiving an invitation from the terminal, and to send responses to the terminal containing said information from at least one of the wireless networks for comparison with a defined value of at least one of the operational parameters for the communication to identify at least one candidate wireless network for the communication, and
   a third party device configured to receive data based on said responses from the one or more identified candidate networks from the terminal through one of the wireless networks to obtain charge-related information for making a decision on which wireless network to use for the communication, the third party device being configured to communicate the charge-related information to the terminal for making the decision.

23. A network arrangement according to claim 22 wherein the plurality of wireless networks includes a public land mobile network (PLMN).

24. A network arrangement according to claim 22 wherein the plurality of wireless networks includes a wireless local area network (WLAN).

25. A network arrangement according to claim 22 wherein the third party device comprises a service provider.

26. A third party device for use in selecting a network to provide wireless communication with a terminal, when a plurality of such wireless networks is available to provide the communication, the wireless networks being configured according to different values of network operational parameters for the communication, wherein the value of at least one of the operational parameters for the communication is defined, the wireless networks are invited by the terminal to provide responses containing information about the operational parameters of the wireless networks respectively available for the communication, for identifying at least one candidate wireless network for the communication, and data based on the or each response from the one or more identified candidate networks is referred by the terminal to the third party device through one of the wireless networks, the third party device comprising:
   an information retriever arranged to obtain charge-related information for making a decision on which wireless network to use for the communication in response to receiving said data from the terminal, and,
   a transmitter to communicate the charge-related information to the terminal for making the decision.

27. A third party device according to claim 26, wherein the information which is referred by the terminal to the third party device includes information from the plurality of wireless networks.

28. A non-transitory computer-readable medium storing thereon a computer program which, when executed by data processing apparatus, causes said data processing apparatus to perform a method, the method:

defining the value of at least one of the operational parameters for the communication,     sending an invite to the networks available for the communication to invite the available networks to provide information about their operational parameters,     receiving responses containing said information from at least one of the networks and using said information to identify at least one candidate network for the communication,     referring data based on the or each response from the one or more identified candidate networks to a third party device through one of the networks to obtain charge-related information for making a decision on which network to use for the communication, and     receiving the charge-related information from the third party device for making the decision.

\* \* \* \* \*